No. 850,799. PATENTED APR. 16, 1907.
R. A. SHOWERS.
DUMPING WAGON.
APPLICATION FILED JAN. 3, 1907.
2 SHEETS—SHEET 1.
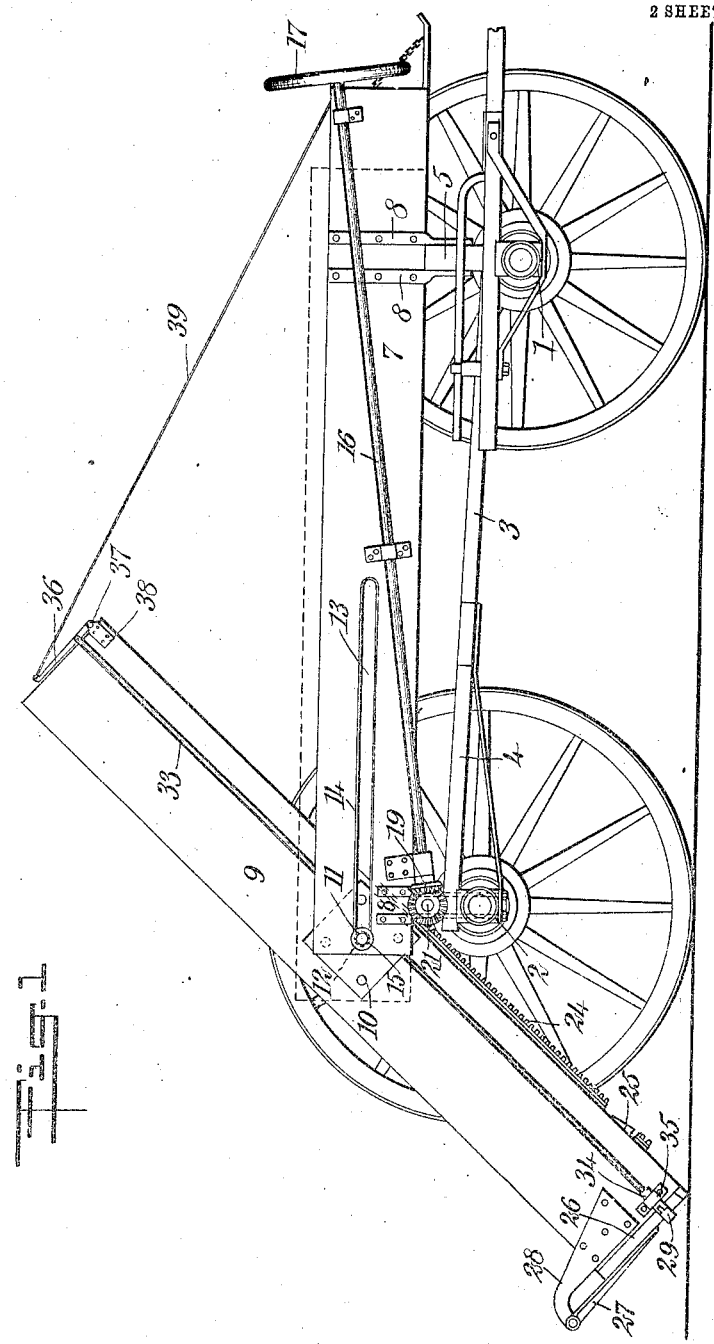
WITNESSES
INVENTOR
Roy A. Showers
BY
ATTORNEYS No. 850,799. PATENTED APR. 16, 1907.
R. A. SHOWERS.
DUMPING WAGON.
APPLICATION FILED JAN. 3, 1907.
2 SHEETS—SHEET 2.
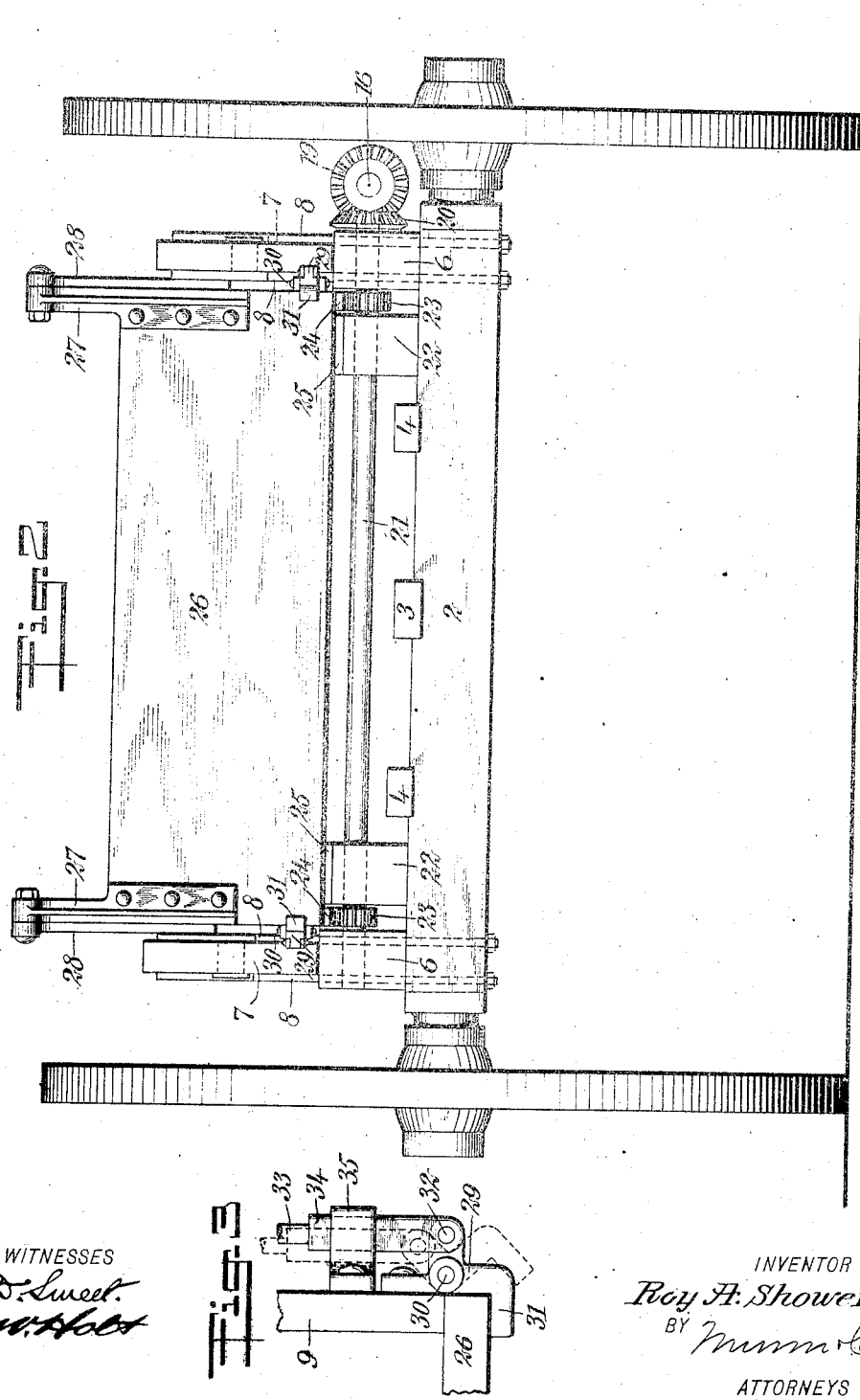
WITNESSES
F. D. Sweet.
INVENTOR
Roy A. Showers
BY Munn & Co
ATTORNEYS

UNITED STATES PATENT OFFICE.

ROY A. SHOWERS, OF SHENANDOAH, IOWA.

DUMPING-WAGON.

No. 850,799.  Specification of Letters Patent.  Patented April 16, 1907.

Application filed January 3, 1907. Serial No. 350,595.

*To all whom it may concern:*

Be it known that I, ROY A. SHOWERS, a citizen of the United States, and a resident of Shenandoah, in the county of Page and State of Iowa, have invented a new and Improved Dumping-Wagon, of which the following is a full, clear, and exact description.

This invention is directed to improvements in dumping-wagons having for objects, among others, to provide a dumping-wagon which can be operated by the driver without shifting his position to carry the body of the wagon, together with its load, rearwardly and inclinedly rest it at the required point of discharge; also, to provide means for releasing and unlocking the tail-gate of the wagon from the driver's seat.

Reference is to be had to the accompanying drawings, forming a part of this specification, in which similar characters of reference indicate corresponding parts in all the figures.

Figure 1 is a side elevation of my improved wagon, showing the body thereof shifted to dumping position, also showing in dotted outline the normal position of said body. Fig. 2 is a rear end elevation of the wagon with the body thereof in position, and Fig. 3 is an enlarged plan of the tail-gate-locking mechanism.

The invention embodies in its construction a running-gear of the usual or any desired type, that shown comprising a front and rear axletree 1 and 2, respectively, connected by a reach 3, which is braced at each side to the rear axletree by hounds 4. On the front axletree 1 a bolster-block 5 is carried, which, in connection with blocks 6, carried by the rear axle 2, support auxiliary sides 7 for the wagon, said sides being further connected to the running-gear by metal straps 8, embracing the same on both faces at each end.

The body 9 for the wagon has secured to the outer face at each side thereof slightly forward of its transverse center a wear-plate 10, each wear-plate having centrally arranged thereon a trunnion 11, on which is journaled a roller 12. The rollers 12 are of such diameter as to neatly fit in longitudinal slots 13, provided in the auxiliary sides 7 at the rear end of the wagon, as best shown in Fig. 1. The edges of the slots 13 are preferably covered with metal strips 14 in order to relieve them of undue wear by the rollers, the latter being retained therein by a washer or other device 15, fixed to the outer end of each trunnion 11.

Journaled at an inclination in bearings carried by one of the auxiliary sides 7 is a shaft 16, having a hand-wheel 17 fixed at its upper and forward end adjacent to the driver's seat and a small bevel-gear 19 secured to its opposite end near the axletree 2. This bevel-gear 19 meshes with a like gear 20, carried at the outer end of a shaft 21, said shaft being journaled in the block 6 directly over the axletree 2 and also in blocks 22, carried by said axletree at the inside of the blocks 6. Sufficient space is left between the blocks 6 and 22 to receive gears 23, fixed to the shaft 21, said gears meshing with rack-bars 24, longitudinally carried on the under face of the body 9. The upper faces of the blocks 22 are inclined rearwardly and provide seats for blocks 25, secured to the under face of the body 9, said blocks 25 having inclined faces, as shown in Fig. 1, corresponding to those of the blocks 22, but are beveled in the opposite direction.

The rear end of the wagon-body is provided with a tail-gate 26, hinged to swing upwardly, the hinges comprising upwardly-projecting arms 27, fixed at each side of the tail-gate, pivotally connected with arms 28, fixed at the sides of the wagon-body.

For locking and retaining the tail-gate in place is provided at each side thereof, preferably near its lower edge, a bell-crank lever 29, pivoted at 30 to a bracket carried by the wagon-body and having a projecting toe 31 moving into and out of the path of the tail-gate when rocked on its pivotal connection. For rocking these levers at the driver's seat said levers are pivotally connected at 32 to a connecting-rod 33, the latter having an enlarged portion 34 guided in a bracket 35, also attached to the wagon-body. The opposite end of the connecting-rod 33, as shown in Fig. 1, is pivotally attached to a lever 36 above its pivot 37, which is provided at the forward end of a bracket 38. The opposite and upper end of said lever 36 is connected by any flexible line 39 leading to the driver's seat, where is is operable, as is obvious, through the intermediate mechanism to withdraw the bell-crank levers 29 to the dotted position shown in Fig. 3, and thus permit the load carried by the wagon-body to force the tail-gate outwardly and upwardly.

The wagon-body being in its normal position, as shown in dotted outline in Fig. 1, when it is desired to discharge the load the hand-wheel 17 is revolved in the proper direction to shift the wagon-body rearwardly through the shafts 16 and 21 and the gearing connected thereto, in connection with the rack-bars 24, carried by the wagon-body. When the rollers 12, carried by the wagon-body, reach the rear ends of the slots 13, said body by reason of the slight increase of weight on its rear end drops to the inclined position, as shown in Fig. 1. On now pulling the line or cord 39 the tail-gate permits the load to slide from the wagon-body.

On revolving the hand-wheel 17 in the opposite direction to draw the wagon-body back upon the running-gear the inclined faces of the blocks 22 and 25 contact just before the body is in position and act on a slight further movement of the same to lift the rack-bars 24 slightly above the gears 23, thus removing the weight of said body entirely from the shaft 21, and bring it to bear directly upon the axletree 2.

Although I have described the invention in detail, I regard the precise embodiment as not material provided the essential characteristics are employed as pointed out in the annexed claims.

Having thus described my invention, I claim as new and desire to secure by Letters Patent—

1. A dumping-wagon comprising a running-gear, auxiliary sides having slots supported by said running-gear, a wagon-body having trunnions projecting from the opposite sides thereof passing through said slots, rack-bars secured to the under side of said body, a shaft having gears fixed thereto in engagement with said rack-bars, and means for operating said shaft whereby said body is shifted on said trunnions in said slots.

2. A dumping-wagon comprising auxiliary sides having longitudinal slots therein, a body having trunnions fixed thereto passing through said slots, rack-bars secured to the under side of said body, a shaft having gears fixed thereto in mesh with said rack-bars, and means for operating said shaft whereby said body is shifted on said trunnions in said slots.

3. A dumping-wagon comprising auxiliary sides having longitudinal slots arranged in the rear ends thereof, a wagon-body having trunnions fixed to its opposite sides passing through said slots, rollers journaled on the trunnions in engagement with the edges of the slots, rack-bars fixed to the under side of said body, a shaft having gears fixed thereto in mesh with said rack-bars, means for revolving said shaft whereby the body is shifted on said rollers in said slots, and means automatically operating to remove the weight of the body from said shaft when said body is in normal position.

4. A dumping-wagon comprising a body having a tail-gate hingedly mounted to swing upwardly and outwardly at the rear end thereof, a bell-crank lever having a toe adapted to be passed in the path of said tail-gate for locking the same in position, and means operable at the forward end of the wagon to work said lever.

5. A dumping-wagon comprising a running-gear, auxiliary sides having slots supported by said running-gear, a body having trunnions fixed to the opposite sides thereof passing into said slots, means for shifting said body on said trunnions in said slots, and blocks having inclined faces fixed to the running-gear and to said body automatically operating to remove the weight of said body from said shifting means when said body is in normal position.

6. A dumping-wagon, comprising a running-gear, a wagon-body supported on the running-gear, auxiliary sides having longitudinal slots supported by said running-gear and running the full length of the body, trunnions fixed to said body and projecting through said slots, and means for shifting said body on said trunnions in said slots.

7. A dumping-wagon comprising a running-gear, a wagon-body supported on the running-gear auxiliary sides having longitudinal slots supported by said running-gear and running the full length of the body, trunnions fixed to said body and projecting through said slots, a shaft having a hand-wheel operable at the front of the wagon journaled in bearings carried by one of said auxiliary sides, and means gearing said shaft with the wagon-body, whereby as said hand-wheel is operated, the body is shifted on said trunnions in said slots.

In testimony whereof I have signed my name to this specification in the presence of two subscribing witnesses.

ROY A. SHOWERS.

Witnesses:
 EARL R. FERGUSON,
 G. E. GRIFFIN.